Nov. 13, 1923.

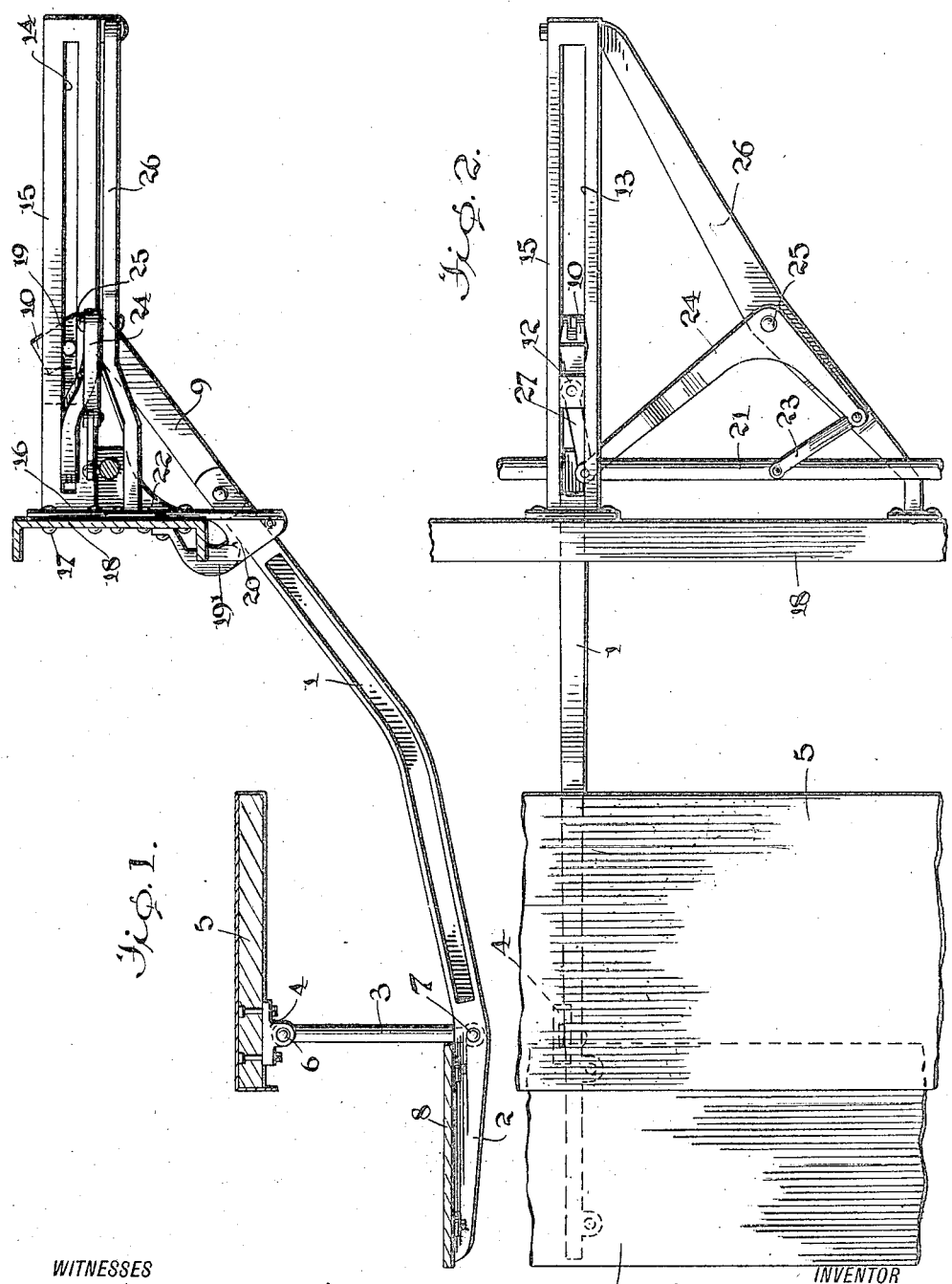

S. KOEBERLIN 1,473,858

FOLDING STEP

Filed Dec. 4, 1922    5 Sheets-Sheet 2

WITNESSES
R. E. Rousseau

INVENTOR
S. Koeberlin,
BY
ATTORNEYS

Nov. 13, 1923.　　　　　　　1,473,858
S. KOEBERLIN
FOLDING STEP
Filed Dec. 4, 1922　　　5 Sheets-Sheet 3
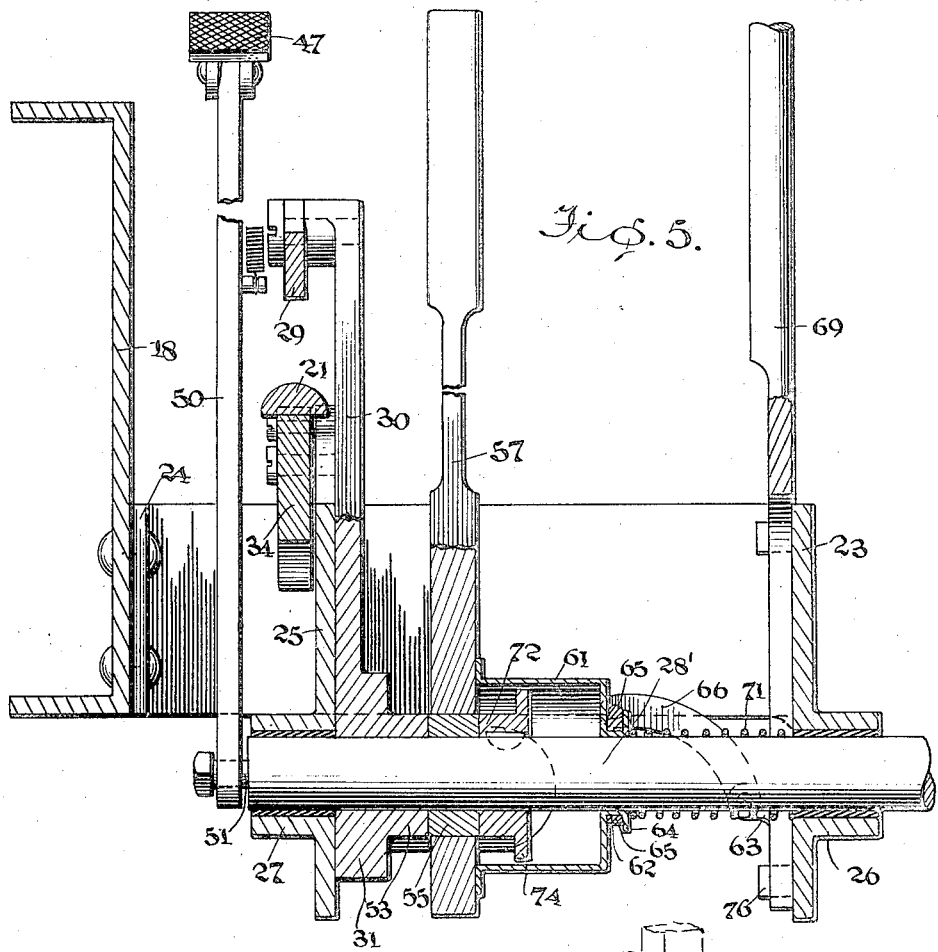
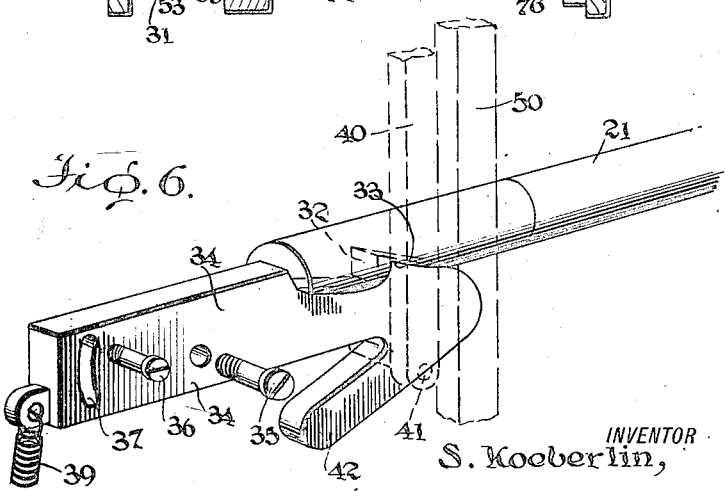
WITNESSES　　　　　　　　　　　INVENTOR
S. Koeberlin,
BY
ATTORNEYS Nov. 13, 1923.
S. KOEBERLIN
1,473,858
FOLDING STEP
Filed Dec. 4, 1922     5 Sheets-Sheet 4
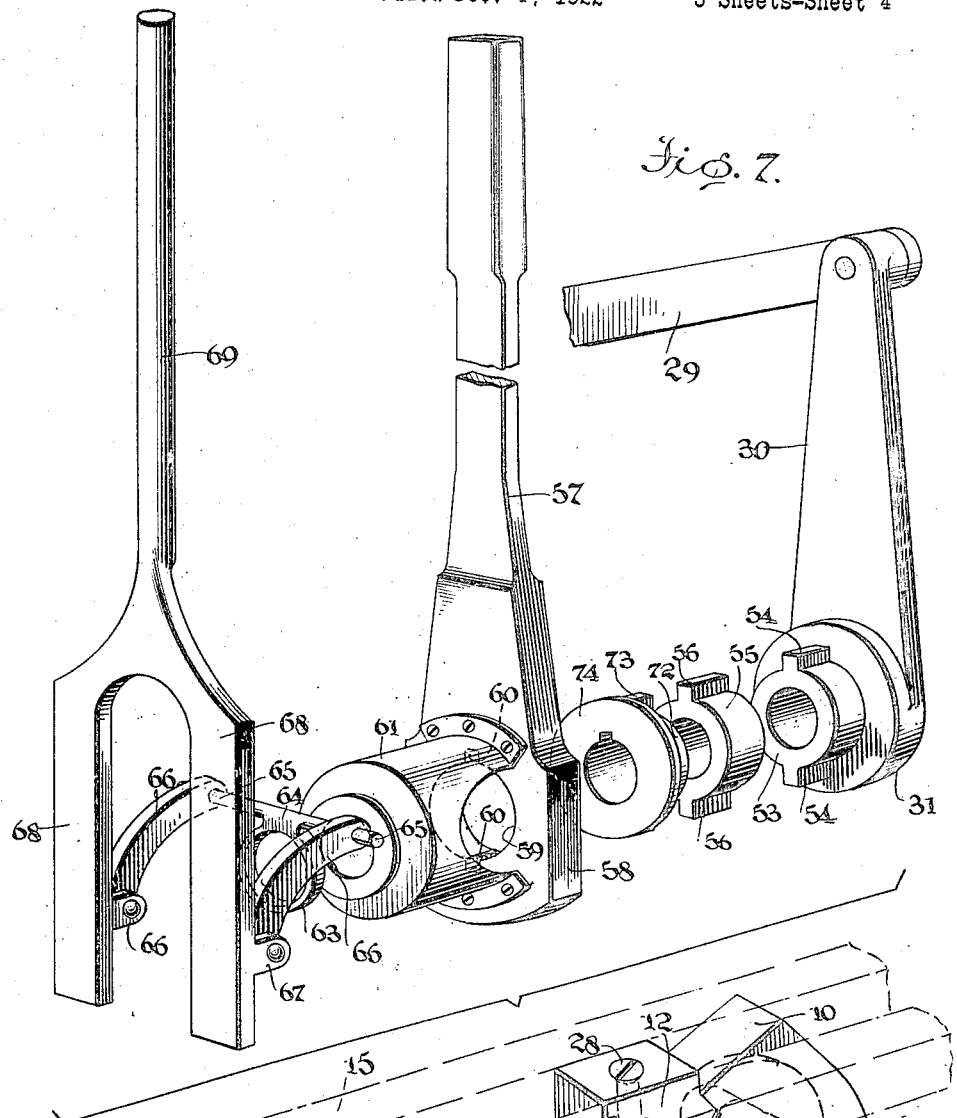
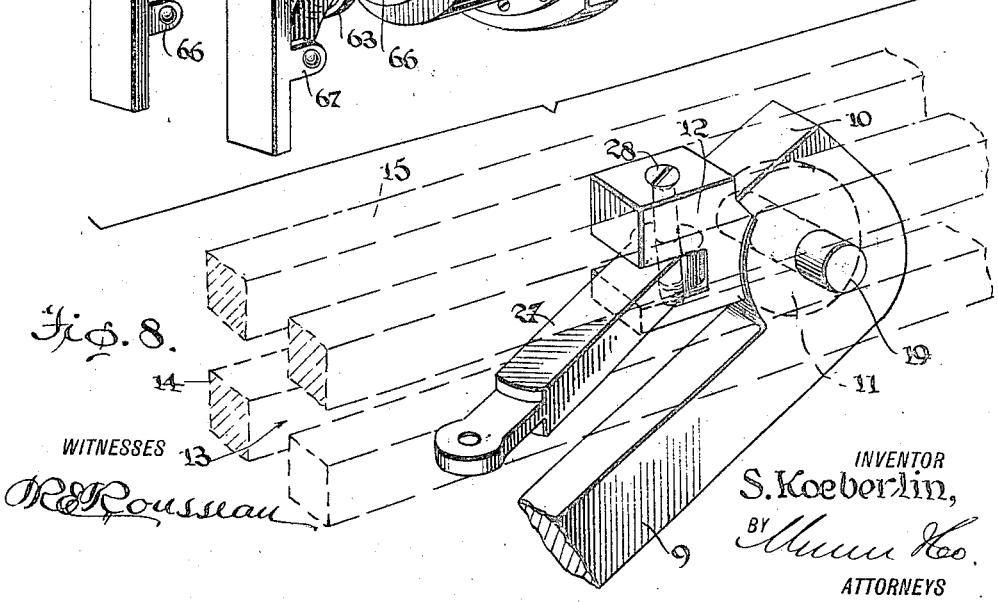
WITNESSES
R. E. Rousseau
INVENTOR
S. Koeberlin,
BY Munn & Co.
ATTORNEYS Nov. 13, 1923.
S. KOEBERLIN
1,473,858
FOLDING STEP
Filed Dec. 4, 1922
5 Sheets-Sheet 5
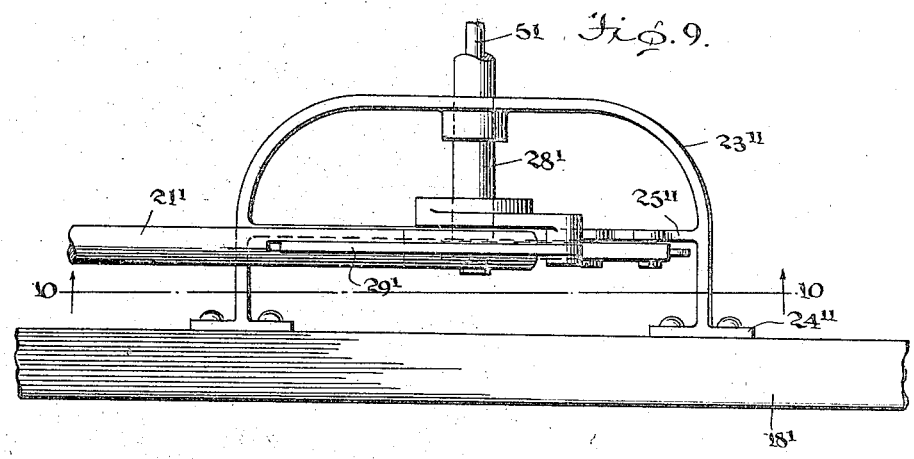
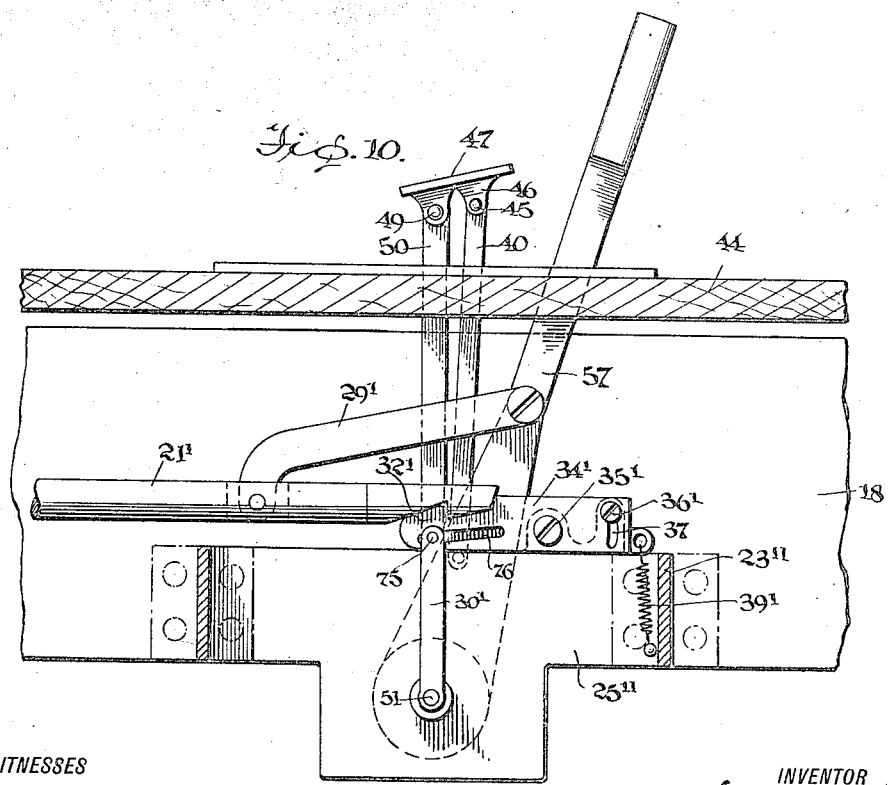
WITNESSES
INVENTOR
S. Koeberlin,
ATTORNEYS Patented Nov. 13, 1923.

1,473,858

UNITED STATES PATENT OFFICE.

SIMON KOEBERLIN, OF FREMONT, NEBRASKA.

FOLDING STEP.

Application filed December 4, 1922. Serial No. 604,616.

*To all whom it may concern:*

Be it known that I, SIMON KOEBERLIN, a citizen of the United States, and resident of Fremont, in the county of Dodge and State of Nebraska, have invented certain new and useful Improvements in Folding Steps, of which the following is a specification.

My invention is a folding step for vehicles, and it consists in the combinations, constructions and arrangements herein described and claimed.

An object of my invention is to provide a step construction which is adapted to be operatively applied to an automobile or like vehicle and which affords facilities whereby treads or steps comprised in the device may be operated by the operator of the vehicle so as to be positioned in extended and fully active position or in retracted and inactive position, as desired.

A further object of the invention is to provide a step construction of the character described which is not likely to get out of order easily and which is throughly practical commercially.

Other objects and advantages of the invention will be apparent from the following description, considered in conjunction with the accompanying drawings, forming a part of this application, in which—

Figure 1 is a view partly in vertical section and partly in side elevation, showing a tread or step proper and tread supporting means comprised in the device in association with a running board and a portion of the frame of a vehicle, the full lines indicating the position of the step proper and the supporting means therefor when the former is in extended position and the dotted lines indicating the position of the same parts in retracted position.

Figure 2 is a plan view of the structure shown in Figure 1,

Figure 3:
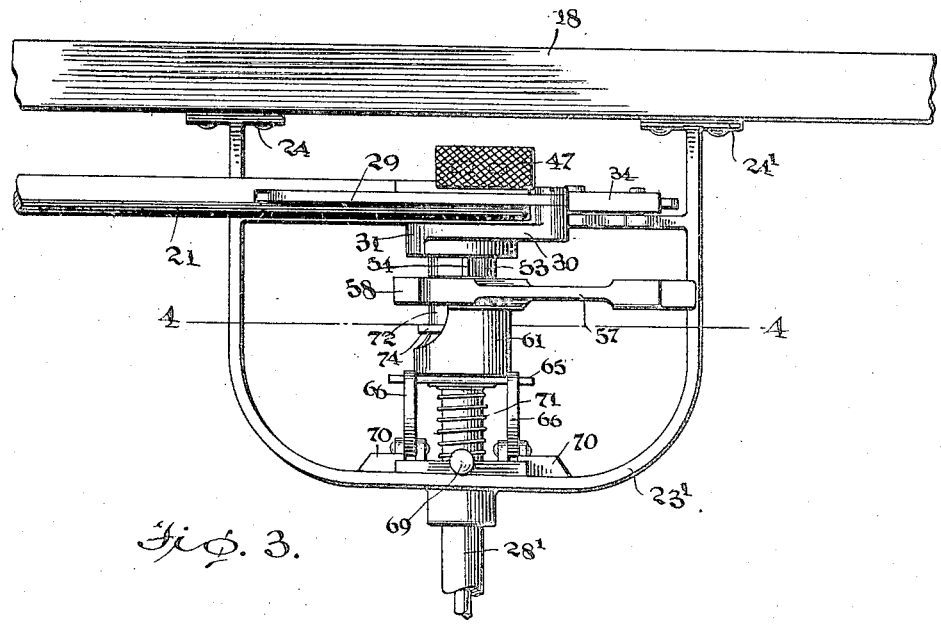
Figure 3 is a fragmentary plan view showing means provided by my invention for operating the means supporting the tread or step proper, in association with the frame member of the vehicle shown in Figure 1.
Figure 4:
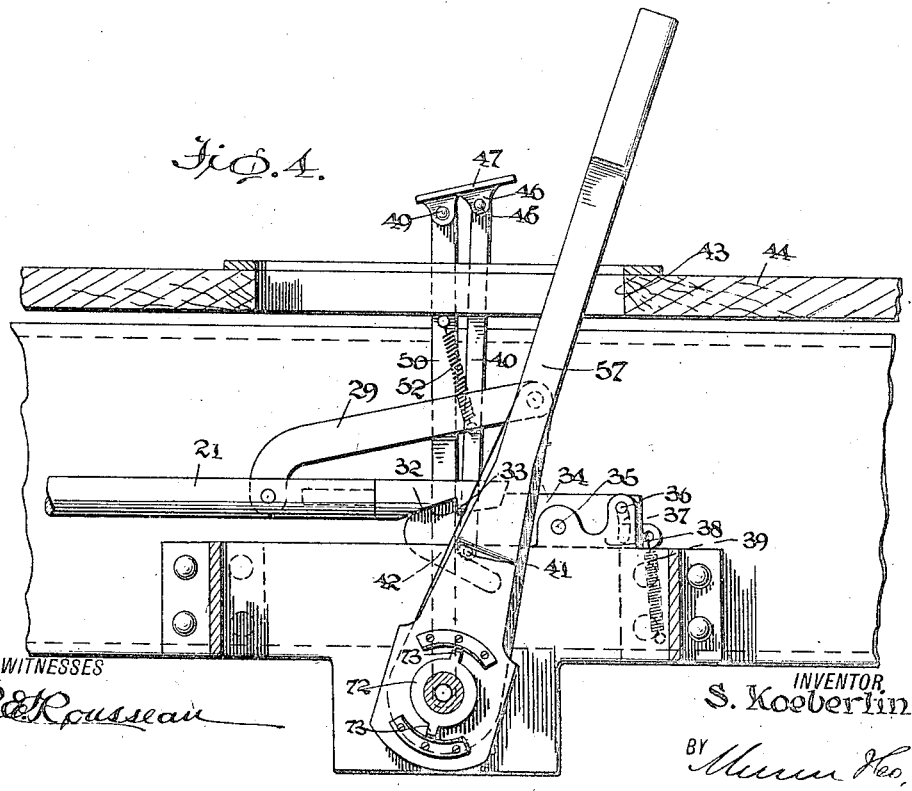
Figure 4 is a section along the line 4—4 of Figure 3.

Figure 5 is a relatively enlarged vertical sectional view, showing a portion of the structure exhibited in Figures 3 and 4, Figure 6 is a detail perspective view showing certain elements of the structure shown in Figures 3 to 5 inclusive, Figure 7 is a group view showing in detached and separated relation cooperative elements shown in Figures 3 to 5 inclusive for connecting an operating lever to a rock shaft, the latter being omitted from the view, Figure 8 is a relatively enlarged fragmentary perspective view showing a portion of the structure shown in Figures 1 and 2, Figure 9 is a view similar to Figure 3, showing means positioned at the side of the vehicle opposite that shown in Fig. 3 for operating a tread at the second-named side of the vehicle, and Figure 10 is a section along the line 10—10 of Figure 9.

In Figures 1 and 2, I show a supporting arm 1 having a horizontally disposed end portion 2 suspended by means of a hanger rod 3 from a bracket 4 secured to the underside of a flat horizontal member 5 which in actual practice is the running board of an automobile. The hanger rod 3 is pivotally connected at its upper end to the bracket 4, as indicated at 6 and is pivotally attached at its lower end at 7 to the horizontal portion 2 of the supporting arm 1 at the inner end of such horizontal portion. The horizontal portion 2 of the arm 1 is attached to and supports a superposed tread plate or step proper 8.

The supporting arm 1 is bent as clearly shown in Figure 1 and is sectional, including a pivotally attached end section 9 at the end thereof remote from the horizontal portion 2, which end section is formed with a head 10 apertured to receive a tongue portion 11 of a slidable block 12, as best seen in Figure 8. The block 12 is slidable in a horizontal guide way defined by intersecting longitudinally extending apertures 13 and 14 respectively provided in a horizontal support 15 which is rigidly secured at one end to or may be integral with a bracket or attaching plate 16 secured by bolts 17 or the like to a fixed support 18 which is in actual practice one of the side frame members of the automobile provided with the running board 5. A horizontal pivot pin 19 connecting the tongue 11 to the head 10 projects at its ends beyond the plane of the side walls of the aperture 13 into the aperture 14 and thus holds the connected together block 12 and head 10 against displacement vertically from the support 15. The connected together head 10 and block 12 are of course held against lateral movement because of the engagement thereof with the side walls of the aperture 13.

The attaching plate or bracket 16 has a depending portion 19 apertured at 20 to permit of the arm 1 extending loosely therethrough. It will thus be apparent that movement of the block 12 along the support 15 from the position indicated by the full lines in Figures 1 and 2 will cause a swinging of the hanger rod 3 about the axis of the pivot 6 whereby the tread plate or step proper 8 will be moved to position beneath the running board 5, as indicated by the dotted lines in Figure 1.

A horizontally disposed slidable rod 21 extending through an opening in an extension 22 to the bracket or attaching plate 16 is connected by a link 23 to one end of a bell-crank 24 which is pivotally supported at 25 upon a support 26 extending in bracing relation between the frame member 18 and the outer end of the support 15. The other end of the bell-crank 24 is connected by a link 27 to the block 12, the link 27 and the adjacent end portion of the bell-crank moving freely through the horizontal aperture 14 about the axis of a vertical pivot 28 which attaches the link 27 to the block 12, as best seen in Figure 8.

It will be obvious that slidable movement of the rod 21 in the direction of its length will cause the block 12 to be slid longitudinally of the support 15 and thus raise or lower the tread 8 in the manner hereinbefore described.

My invention provides means operable at an appreciable distance from the tread or step proper 8 to slide the rod 21 as required to raise or lower the tread. Such means includes a frame 23' which is substantially U-shaped and has the arms thereof provided at their ends with attaching plates 24'—24' secured to the frame member 18. The frame 23' also includes a cross piece 25' extending between the arms thereof and preferably being integral with the remainder of the frame.

As clearly shown in Figure 5, the web portion of the frame 23' and the cross piece 25' are provided with aligned bearings 26'—27' respectively, in which a hollow rock shaft 28' is journaled. The slidable rod 21 is connected by a link 29 to an arm 30 having a hub portion 31 rotatably mounted upon the rock shaft 28' in adjacent relation to the cross piece 25'. It will be noted that the connection of the link 29 with the slidable rod 21 is at an appreciable distance from the adjacent end of the latter and that such end portion of the slidable rod is provided with a notch 32 in its lower side which is adapted to be engaged by a projection 33 extending upwardly from a latch 34 which is supported intermediately of its length on the cross piece 25', as indicated at 35. The latch 34 is thus mounted for movement about a fixed horizontal axis and is provided at the end thereof remote from the projection 33 with a laterally extending stud 36 in sliding engagement with an arcuate slot 37 in an edgewise disposed upstanding extension 38 to the cross piece 25', whereby the swinging movement of the latch 34 about the axis of the pivot 35 is limited. A retractile spring 39 connecting the end of the latch 34 remote from the projection 33 with the cross piece 25' tends to hold the latch in such position that the projection 33 is in engagement with the notch 32 and the stud 36 is at the upper end of the arcuate guide slot 37. The slidable rod 21 is thus effectively held against movement in one direction.

The means for moving the latch out of locking engagement with the slidable rod 21 will now be described. Such means includes a rod 40 provided at its lower end with a roller 41 in contact with the upper side of an arm 42 which is integral with the latch 34 and depends therefrom in inclined relation thereto. As clearly shown in Figures 4 and 6, the arm 42 is but slightly inclined in respect to the horizontal and is merged into the body of the latch 34 at the end of the latter provided with the projection 33, extending rearwardly from its juncture with the body of the latch. The rod 40 extends vertically through an opening 43 in a support 44 which is in fixed relation to the bearing member 18 and which may be the floor of a vehicle equipped with my invention. The rod 40 projects above the level of the support 44 and is pivotally attached at 45 to a lug 46 depending from the underside of a treadle or foot plate 47 adjacent to one end of the latter. The treadle or foot plate 47 is pivotally supported adjacent to its other end, as indicated at 48 upon a standard or upright support 50 which depends through the opening 43 and is rigidly secured at its lower end upon one end portion of a shaft 51 which is journalled in the bore of the rock shaft 28' and extends beyond the ends of the latter. A retractile spring 52 is attached at one end to the support 50 and is attached at its other end at a lower level to the rod 40, whereby the latter is normally held in the position in which illustrated in Fig. 4, at which time the roller carried at the lower end thereof is resting upon the upper side of the inclined arm 42 at the upper end of the latter, the contact of the roller with the body of the latch serving to prevent further upward movement of the rod 40 in response to the actuation of the spring 52.

It will be apparent that when the foot plate or treadle 47 is pressed and swung downwardly about the axis of the pivot 49, the engagement of the roller 41 with the arm 42, which is in effect a cam projection, will swing the one end of the latch 34 downwardly against the action of the spring 39 and out of engagement with the slidable rod 21. Upon removal of pressure from the treadle or foot plate 47, the spring 52 will act to return the rod 40 to the position in which illustrated in Figure 4 and the spring 39 will likewise act to return the latch 34 to position to engage with the slidable rod 21, as also illustrated in Figure 4.

The hub 31 of the arm 30 is provided with an axially aligned annular extension at the end thereof remote from the cross piece 25'. The annular or ring extension 53 has an outer diameter considerably less than that of the hub 31 and is provided at diametrically opposite points with outwardly extending splines 54—54. A ring 55 which is rotatably mounted upon the rock shaft 28' in adjacent relation to the ring extension 53 diametrically equal to the latter and is likewise provided at diametrically opposite points with radially extending splines 56—56 which are precisely identical in size and shape with the splines 54—54. A lever 57 has a hub portion 58 formed with a bore 59 provided with diametrically opposite key-ways 60—60 adapted to slidingly engage the splines 56—56 or the splines 54—54. The hub 58 of the lever is thus adapted to slide longitudinally of the ring 55 or the ring extension 63 and is held against rotation relatively to the ring 55, when the splines 56—56 are in engagement with the key-ways 60—60 and is likewise held against rotation relatively to the ring extension 53 when the key-ways 60—60 have disengaged the splines 56—56 and are in engagement with the splines 54—54. When the lever 57 is in neutral position, the hub thereof is mounted upon the ring 55 and the free end portion of the lever extends upwardly through the aperture 43, being fashioned at its upper or free end to be gripped conveniently by hand.

A housing 61 extending from the hub portion of the operating lever 57 toward the web portion of the frame 23' in encircling relation to the rock shaft 28' is provided with an integral collar portion 62 fitting the rock shaft and having loosely mounted thereon a ring 63 which is held against movement away from the housing by a retaining flange 54 at the outer end of the collar. The ring 63 is fashioned with a radial enlargement 64 having extending therefrom in the plane of the ring a pair of aligned trunnions 65—65 which extend rotatably through spaced arcuate shaped arms 66—66 which are pivotally supported upon lugs 67—67 extending laterally of forks 68—68 at the lower end of a rod 69 which is of a length to extend upwardly through the support 44. The forks 68—68 embrace the rock shaft 28 and the rod 69 is slidable vertically; the forks 68—68 being held against lateral movement in respect to the web of the frame 23' by guides 70—70 carried by the said frame. An expansion spring 71 coiled about the rock shaft 28 between the flange 54 and the bearing 26' reacts against the former and tends to urge the lever 57 bodily from the position in which illustrated in Figure 5 toward the arm 30.

The ring 55 being rotatable on the rock shaft 28' the lever 57 may be grasped and manipulated until the splines 56—56 are in alignment with the splines 54—54. The spring 71 will then act to effect movement of the lever 57 until the hub portion thereof is disposed upon the ring extension 53 to the hub 31, the splines 54—54 being received within the key-ways 60—60 and the latter being out of engagement with the splines 56—56. The lever 57 thus being locked to the arm 30, rotation of the former about the axis of the rock shaft will occasion longitudinal movement of the slidable rod 21, it being understood that such movement of the latter is not permitted in one direction when the latch 34 is in latching relation thereto. As stated, longitudinal movement of the rod 21 causes raising or lowering of the tread 3. When the latter is in raised or retracted position, the slidable rod 21 is in the position in which illustrated in Figure 4 and is held because of the engagement of the latch 34 therewith against such movement as will permit of the tread or step proper being lowered to active or extended position until the slidable rod has been released from the latch. This may be accomplished in the manner described and the operating lever 57 may then be manipulated to cause the tread or step proper to be lowered to extended or active position and subsequently retracted when desired.

As stated, my invention is designed primarily for application to automobiles for use in conjunction with the running boards thereof and it is therefore desirable that the lever 57 should be capable of operation to effect lowering or raising of the steps proper or treads at opposite sides of an automobile selectively. The manner of controlling the position of a step or tread at one side of an automobile has been described in detail. The rock shaft 28' may extend transversely of the vehicle and may be rotatably supported adjacent to its end remote from the frame 23' by a similar frame designated 23" which is similar to the frame 23' and includes attaching portions 24"—24" secured to a frame member 18', which is a part of the vehicle frame and is parallel to the frame member 18. The shaft 51 extends beyond the end of the rock shaft 28' supported by the frame and is rigidly secured to an arm 30 which carries at its upper end a laterally extending stud or pin 75 engaging an inclined slot 76 through one end portion of a latch 34' which is intermediately pivoted at 35' upon a cross piece 25'' of the frame 23''. A laterally extending stud or pin 36' carried by the cross piece 25'' engages an arcuate slot 37' in the second end portion of the latch 34' and limits the extent of movement of the latter about the axis of its pivot. A spring 39' connecting the latch 34' to the cross piece 25'' tends to hold the former so that an upwardly extending projection 33' at the first named end of the latch 34' will be held in engagement with a notch 32' in a slidable rod 21' which is identical in essential respects with the rod 21, being connected by a link 29' to an arm 30' carried by the rock shaft 28' at its second named end.

It will be understood that the rod 21' is connected with an arrangement (not shown and identical in essential respects with that illustrated in Figs. 1 and 2) for movably supporting a step at the second named side of the vehicle. It will be understood also that the rod 21' will be held against axial movement in one direction when engaged by the latch 34'.

When it is desired to release the rod 21' from the latch 34', the treadle 47 is pushed forwardly so that the rod 40 and the standard 50 will swing as a unit about the axis of the shaft 51. Since the standard 50 is fast to the shaft 51, the latter will be turned and the arm 30' will be rocked to an extent sufficient to draw the one end of the latch 34' downwardly out of engagement with the rod 21. The latch 34 will not be moved out of engagement with the rod 21 when the rod 40 and standard 50 are swung forwardly as a unit to release the rod 21' in the manner described. When this has been accomplished and it is desired to raise or lower the second step, the lever 57 being in neutral position upon the ring 55, the rod 60 is depressed against the action of the spring 71, thereby pulling the lever 57 bodily toward the rod 69 so that the hub 58 is moved from position on the ring 55 into position upon a ring 72 which is keyed to the rock shaft 28 in contiguous relation to the ring 55 and which is provided with diametrically opposite splines 73—73 adapted to engage with the key-ways 60—60 in the bore of the hub 58. A flange 74 at the end of the ring 72 proximate to the lever 69 limits the extent of movement of the lever 57 in response to the influence of pressure moving the lever 69 downwardly.

When the lever 57 is positioned upon the ring 72, swinging movement thereof about the axis of the latter will cause rotation of the rock shaft 28', whereby the second mentioned step may be raised or lowered at will. The lever 57 will be returned to neutral position upon the ring 55 when the splines 73—73 are in alignment with the splines 56—56 and pressure is removed from the grip upon the lever 57.

It will be apparent from the foregoing that a step proper or tread comprised in the device will be positively held in raised or inactive position when desired and that it may be quickly and positively moved to lowered or extended position by an operator located at an appreciable distance therefrom, as for instance by the operator of an automobile equipped with the invention. When the step proper or tread is in raised or inactive position, it is protected from injury because of its position beneath a running board of a vehicle and is thus held out of the way until use may be made thereof.

Obviously, my invention is susceptible of embodiment in forms other than that illustrated herein and I therefore consider as my own all modifications of the form of the invention described herein which fairly fall within the scope of the appended claims.

I claim:—

1. An attachment of the character described comprising an arm, a hanger pivotally attached to said arm at an appreciable distance from one end of the latter and at a greater distance from its other end, said hanger being adapted for attachment to the underside of a running board of a vehicle, a tread supported upon the arm between the hanger and the proximate end of the arm, a support adapted for attachment to the frame of the vehicle and having a horizontal guide-way therein, a block slidable in the guide-way and being pivotally connected with the end of the arm remote from the hanger, a bell-crank supported adjacent to said block for movement about a vertical axis, a link connecting one arm of said bell-crank to said block a horizontal rod extending substantially at right angles to the direction of said guide-way and being slidable in the direction of its length and a link connecting the other arm of said bell-crank to said slidable rod.

2. An attachment of the character described comprising an arm, a hanger pivotally attached to said arm at an appreciable distance from one end of the latter and at a greater distance from its other end, said hanger being adapted for attachment to the underside of a running board of a vehicle, a tread supported upon the arm between the hanger and the proximate end of the arm, a support adapted for attachment to the frame of the vehicle and having a horizontal guide-way therein, a block slidable in the guide-way and being pivotally connected with the end of the arm remote from the hanger, a bell-crank supported adjacent to said block for movement about a vertical axis, a link connecting one arm of said bell-crank to said block, a horizontal rod extending substantially at right angles to the direction of said guide-way and being slidable in the direction of its length, a link connecting the other arm of said bell-crank to said slidable rod, and means operable at will to shift the slidable rod in the direction of its length.

3. An attachment of the character described comprising an arm, a hanger pivotally attached to said arm at an appreciable distance from one end of the latter and at a greater distance from its other end, said hanger being adapted for attachment to the underside of a running board of a vehicle, a tread supported upon the arm between the hanger and the proximate end of the arm, a support adapted for attachment to the frame of the vehicle and having a horizontal guide-way therein, a block slidable in the guide-way and being pivotally connected with the end of the arm remote from the hanger, a bell-crank supported adjacent to said block for movement about a vertical axis, a link connecting one arm of said bell-crank to said block, a horizontal rod extending substantially at right angles to the direction of said guide-way and being slidable in the direction of its length, a link connecting the other arm of said bell-crank to said slidable rod, a shaft supported in adjacent relation to said slidable rod and extending substantially at right angles to the direction of the latter, an arm rotatably mounted upon the shaft, a link connecting said last named arm with said slidable rod, and an operating lever slidable longitudinally of the shaft engageable with said last named arm to control the operation thereof.

4. An attachment of the character described comprising an arm, a hanger pivotally attached to said arm at an appreciable distance from one end of the latter and at a greater distance from its other end, said hanger being adapted for attachment to the underside of a running board of a vehicle, a tread supported upon the arm between the hanger and the proximate end of the arm, a support adapted for attachment to the frame of the vehicle and having a horizontal guide-way therein, a block slidable in the guide-way and being pivotally connected with the end of the arm remote from the hanger, a bell-crank supported adjacent to said block for movement about a vertical axis, a link connecting one arm of said bell-crank to said block, a horizontal rod extending substantially at right angles to the direction of said guide-way and being slidable in the direction of its length, a link connecting the other arm of said bell-crank to said slidable rod, a shaft supported in adjacent relation to said slidable rod and extending substantially at right angles to the direction of the latter, an arm rotatably mounted upon the shaft, a link connecting said last named arm with said slidable rod, an operating lever slidable longitudinally of the shaft and engageable with said last named arm to control the operation thereof, a pivoted latch engageable with said slidable rod to hold the latter against movement in one direction, spring means actuating said latch to tend to hold the latter in latching engagement with the slidable rod, and means associated with said latch for actuating the latter to release the slidable rod.

5. In an attachment of the character described, a rod shifting device comprising a frame adapted for attachment to a fixed support, a horizontal shaft journaled in said frame, a slidable rod supported in adjacent relation to the frame, an arm having a hub portion rotatably mounted on said shaft, a link connecting the outer end of said arm with said slidable rod, a ring extension secured to the one end of said hub, said ring extension being axially aligned with the hub, being diametrically smaller, and having diametrically opposite radial splines thereon, a ring rotatably mounted on said shaft in adjacent relation to said ring extension, said second ring having diametrically opposite splines thereon similar to the first named splines, a third ring rigidly secured to the shaft in adjacent relation to the second-named ring, said third ring having diametrically opposite splines thereon similar to the first and second-named splines and having also a flange thereon at the end thereof remote from the second ring, an operating lever having a hub provided with diametrically opposite key-ways in the bore thereof adapted to said splines, whereby said operating lever may be slid longitudinally of the three rings when the corresponding splines thereof are in alignment with respect to one another, spring means reacting against said operating lever to urge the latter from position on the second ring to position on the first ring, whereby operation of the lever will occasion movement of said slidable rod, and means operable at will for moving said operating lever from position on the second ring to position on the third ring, whereby operation of the lever will rotate said shaft, as and for the purpose set forth.

6. An attachment of the character described comprising a pair of rods, means attachable to the vehicle frame for slidably supporting the rods at opposite sides of the vehicle, latch means for releasably holding each rod against movement in one direction, and means for operating each latch and the rod associated therewith as described.

7. An attachment of the character described comprising a pair of rods, means attachable to the frame of a vehicle for slidably supporting the rods at opposite sides of the vehicle, spring pressed pivoted latches engaging said rods to hold them inactive, pedal controlled means for operating said latches selectively to release said rods, and a lever controlled means for operating the rods, when released.

8. An attachment of the character described comprising a pair of rods, means attachable to the frame of a vehicle for slidably supporting the rods at opposite sides of the vehicle, a hollow rock shaft extending transversely of the vehicle frame, a link pivotally connecting one of said slidable rods to one end portion of said hollow rock shaft, an arm having a hub portion loosely mounted on the rock shaft adjacent to the other end of the latter, a lever mounted on said hollow rock shaft and engageable at will with the hub portion of said arm or with said hollow rock shaft, whereby said rods may be operated selectively, a second rock shaft journalled in said hollow rock shaft and projecting beyond the ends of the latter, a pivoted spring urged latch engaging said first slidable rod to hold it inactive, means carried by said second rock shaft at one end thereof for operating said latch to release said first slidable rod, operating means connecting with said second rock shaft at the other end of the latter, a second pivoted spring pressed latch engaging the second slidable rod to hold it inactive, and means controlled by said operating means for the second rock shaft for operating said second latch.

SIMON KOEBERLIN.